(12) United States Patent
Yang et al.

(10) Patent No.: US 12,115,949 B2
(45) Date of Patent: Oct. 15, 2024

(54) ELECTRONIC DEVICE TO DETECT CONTAMINATION, MELT ICE AND REMOVE WATER

(71) Applicant: GM Global Technology Operations LLC, Detroit, MI (US)

(72) Inventors: Bo Yang, Rochester Hills, MI (US); Yuchuan Liu, Troy, MI (US); Julien P. Mourou, Bloomfield Hills, MI (US); Zhe Li, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 143 days.

(21) Appl. No.: 17/534,810

(22) Filed: Nov. 24, 2021

(65) Prior Publication Data

US 2023/0159004 A1    May 25, 2023

(51) Int. Cl.
| | |
|---|---|
| *B60S 1/56* | (2006.01) |
| *B60R 1/06* | (2006.01) |
| *B60S 1/02* | (2006.01) |
| *B60S 1/66* | (2006.01) |
| *G01S 17/931* | (2020.01) |
| *G02B 27/00* | (2006.01) |
| *H02N 1/00* | (2006.01) |

(52) U.S. Cl.
CPC .............. *B60S 1/56* (2013.01); *B60R 1/0602* (2013.01); *B60S 1/02* (2013.01); *B60S 1/66* (2013.01); *G01S 17/931* (2020.01); *G02B 27/0006* (2013.01); *H02N 1/004* (2013.01)

(58) Field of Classification Search
CPC ...... B60S 1/56; B60S 1/02; B60S 1/66; B60R 1/0602; G01S 17/931; G02B 27/0006; G02B 1/16; G02B 1/18; H02N 1/004

USPC .......................................................... 348/148
See application file for complete search history.

(56) References Cited

U.S. PATENT DOCUMENTS

| | | | |
|---|---|---|---|
| 10,895,737 B1* | 1/2021 | Wells ................. | G02B 26/0875 |
| 11,320,588 B1* | 5/2022 | Mazed .................. | G16H 10/40 |
| 2008/0107542 A1* | 5/2008 | Hernandez ............. | B08B 17/02 |
| | | | 417/48 |
| 2011/0188113 A1* | 8/2011 | Dede .................. | G02B 27/0006 |
| | | | 359/399 |
| 2016/0084986 A1* | 3/2016 | Zach ........................ | E04H 9/16 |
| | | | 356/402 |
| 2017/0334397 A1* | 11/2017 | Mueller ................ | G01S 15/931 |
| 2018/0046183 A1* | 2/2018 | Peters ................. | B60W 50/032 |
| 2018/0208028 A1* | 7/2018 | Seubert ..................... | H05B 3/84 |
| 2018/0222450 A1* | 8/2018 | Kunze ........................ | B60S 1/50 |
| 2018/0263082 A1* | 9/2018 | Richmond ............... | H05B 3/84 |
| 2018/0312116 A1* | 11/2018 | Brok ....................... | B60S 1/023 |

(Continued)

*Primary Examiner* — Brian P Yenke
*Assistant Examiner* — Sean N. Haiem
(74) *Attorney, Agent, or Firm* — CANTOR COLBURN LLP (57) ABSTRACT

A Lidar system, window of the Lidar system and a method of moving a fluid along a window. The window includes a first electrode disposed on a first side of a outermost layer of the window, a second electrode disposed on the first side of the outermost layer, and a processor. The processor is configured to activate the first electrode to draw a fluid to a first location on a second side of the outermost layer opposite the first electrode, deactivate the first electrode, and activate the second electrode to draw the fluid to a second location on the second side of the outermost layer opposite the second electrode.

20 Claims, 9 Drawing Sheets

(56) References Cited

U.S. PATENT DOCUMENTS

| | | | |
|---|---|---|---|
| 2019/0098705 A1* | 3/2019 | Salter | H05B 3/84 |
| 2019/0277787 A1* | 9/2019 | Chung | B08B 7/02 |
| 2020/0047717 A1* | 2/2020 | Frederick | G02B 27/0006 |
| 2020/0346620 A1* | 11/2020 | Chung | B60S 1/02 |
| 2021/0190924 A1* | 6/2021 | Yamamoto | G01S 17/931 |
| 2023/0123728 A1* | 4/2023 | Reiter | B08B 13/00 |
| | | | 134/56 R |

* cited by examiner

ELECTRONIC DEVICE TO DETECT
CONTAMINATION, MELT ICE AND
REMOVE WATER

INTRODUCTION

The subject disclosure relates to a Lidar system or camera system used in a vehicle and, in particular, to a system and method for cleaning a window of the Lidar/camera system.

Autonomous vehicles use various detection systems for determining the location of objects in its environment. An exemplary system is a Lidar (Light Detection and Ranging) system, in which a laser beam is transmitted into the environment and a reflection of the laser beam off of objects in the environment is received and recorded. The Lidar system generally is housed in a protective housing having an optical element such as a transparent window through which the laser beam and its reflection can pass. This window can accumulate water or fluid on it under certain conditions, such as during rainy weather. The accumulation of fluid can affect the laser beam and therefore impair the accuracy of the Lidar system. When the vehicle is travelling at high speeds, this impairment can affect the performance of the vehicle. Accordingly, it is desirable to provide a system and method for cleaning the fluid from the window as quickly as possible.

SUMMARY

In one exemplary embodiment, a method of moving a fluid along a window is disclosed. A first electrode disposed on a first side of the window is activated to draw the fluid to a first location on a second side of the window opposite the first electrode. The first electrode is deactivated, and a second electrode disposed on the first side of the window is activated to draw the fluid to a second location on the second side of the window opposite the second electrode.

In addition to one or more of the features described herein, the first electrode and the second electrode are disposed in a first electrode layer located at a first distance from the first side. A third electrode and a fourth electrode disposed in a second electrode layer located at a second distance from the first side of the window. The method further includes performing an electrode activation sequence that activates the first electrode, the second electrode, the third electrode and the fourth electrode in sequence to move the fluid at the first location opposite the first electrode to a destination location opposite the fourth electrode. The method further includes repeating the activation sequence when the fluid is at the destination location to draw the fluid away from the destination location. The first electrode and the second electrode can be are arranged in a line along a selected direction or can form a spiral. The method further includes performing at least one of measuring an impedance when at least the first electrode is activated to determine the presence of ice and activating at least the first electrode to melt the ice.

In another exemplary embodiment, a window of a Lidar system is disclosed. The window includes a first electrode disposed on a first side of an outermost layer of the window, a second electrode disposed on the first side of the outermost layer, and a processor. The processor is configured to activate the first electrode to draw a fluid to a first location on a second side of the outermost layer opposite the first electrode, deactivate the first electrode, and activate the second electrode to draw the fluid to a second location on the second side of the outermost layer opposite the second electrode.

In addition to one or more of the features described herein, the first electrode and the second electrode are disposed in a first electrode layer located at a first distance from the first side. The window further includes a third electrode and a fourth electrode disposed in a second electrode layer located at a second distance from the first side of the outermost layer. The processor is further configured to run an electrode activation sequence that activates the first electrode, the second electrode, the third electrode and the fourth electrode in sequence to move the fluid at the first location opposite the first electrode to a destination location opposite the fourth electrode. The processor is configured to repeat the activation sequence to draw the fluid away from the destination location. The first electrode and the second electrode can be are arranged in a line along a selected direction or can form a spiral. The processor is further configured to perform at least one of measuring an impedance when at least the first electrode is activated to detect the presence of ice and activating at least the first electrode to melt the ice.

In another exemplary embodiment, a Lidar system is disclosed. The Lidar system includes a window including a glass layer having a first side and a second side opposite the first side, a first electrode disposed on the first side of the glass layer, a second electrode disposed on the first side of the glass layer, and a processor. The processor is configured to activate the first electrode to draw a fluid to a first location on the second side of the glass layer opposite the first electrode, deactivate the first electrode, and activate the second electrode to draw the fluid to a second location on the second side of the outermost layer opposite the second electrode.

In addition to one or more of the features described herein, the first electrode and the second electrode are disposed in a first electrode layer located at a first distance from the first side, further comprising a third electrode and a fourth electrode disposed in a second electrode layer located at a second distance from the first side. The processor is further configured to run an activation sequence that activates the first electrode, the second electrode, the third electrode and the fourth electrode in sequence to move the fluid at the first location opposite the first electrode to a destination location opposite the fourth electrode. The processor is configured to repeat the activation sequence to draw the fluid away from the destination location. The first electrode and the second electrode can be are arranged in a line along a selected direction or can form a spiral. The processor is further configured to perform at least one of measuring an impedance when at least the first electrode is activated to detect the presence of ice and activating at least the first electrode to melt the ice.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
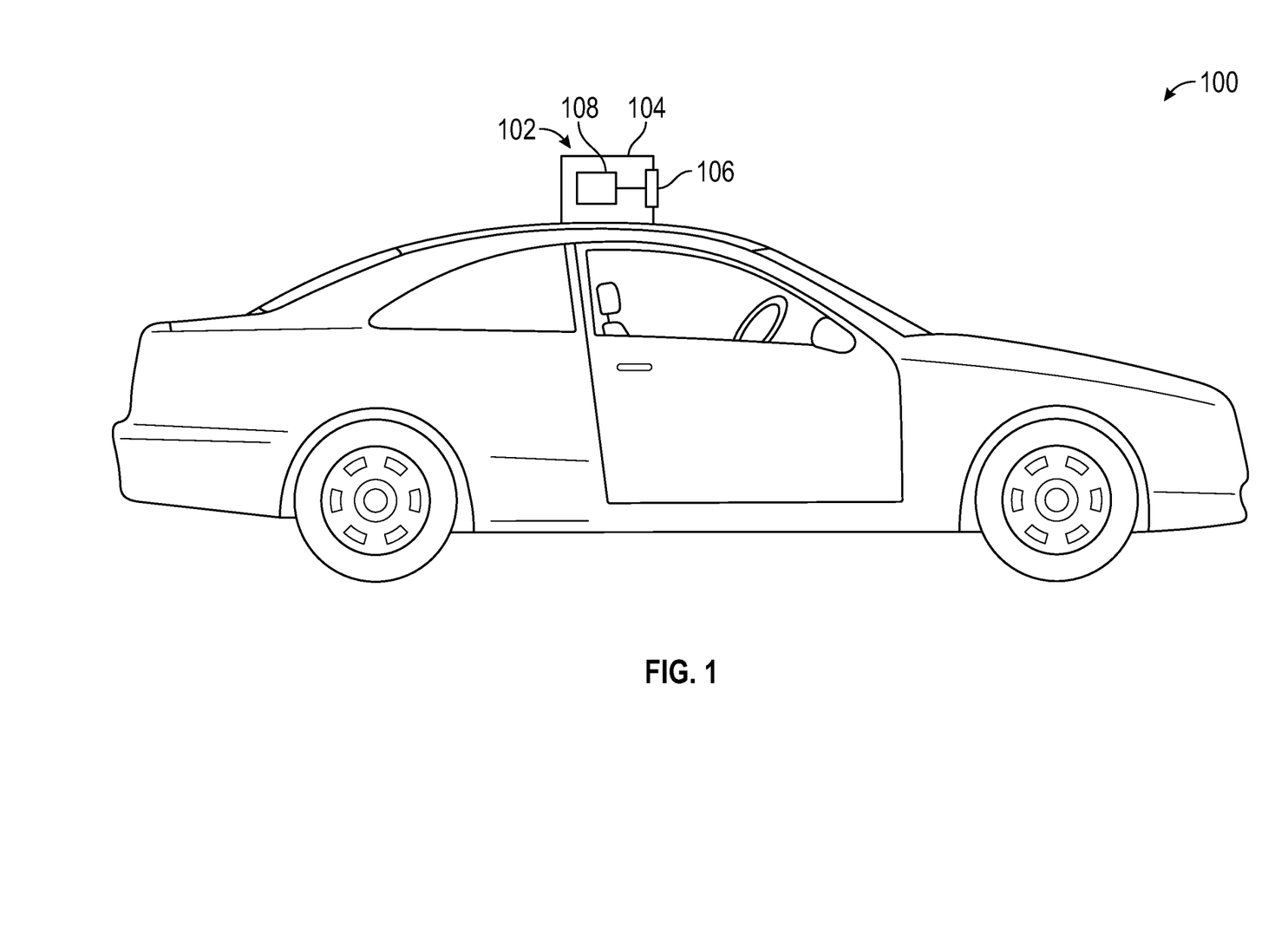
FIG. 1 shows a vehicle having a Lidar system, in an exemplary embodiment.

In accordance with an exemplary embodiment, FIG. 1 shows a vehicle 100 having a Lidar system 102. The Lidar system 102 includes a housing 104 and a window 106. A laser (not shown) is disposed in the housing 104 and the window 106 allows the laser beam to pass through. In various embodiments, the window 106 is oriented at a non-zero angle with respect to a horizontal direction. The window 106 can be oriented vertically or can have a direction along its outer surface having a vertical component, such that a fluid or water runs off of the outer surface along a substantially vertical direction. The window 106 includes circuitry therein, as disclosed herein, suitable for cleaning fluids, such as rain, from its outer surface. The vehicle 100 further includes a processor 108 that operates the Lidar system 102 as well as the circuitry for cleaning fluids from the window 106.

Figure 2:
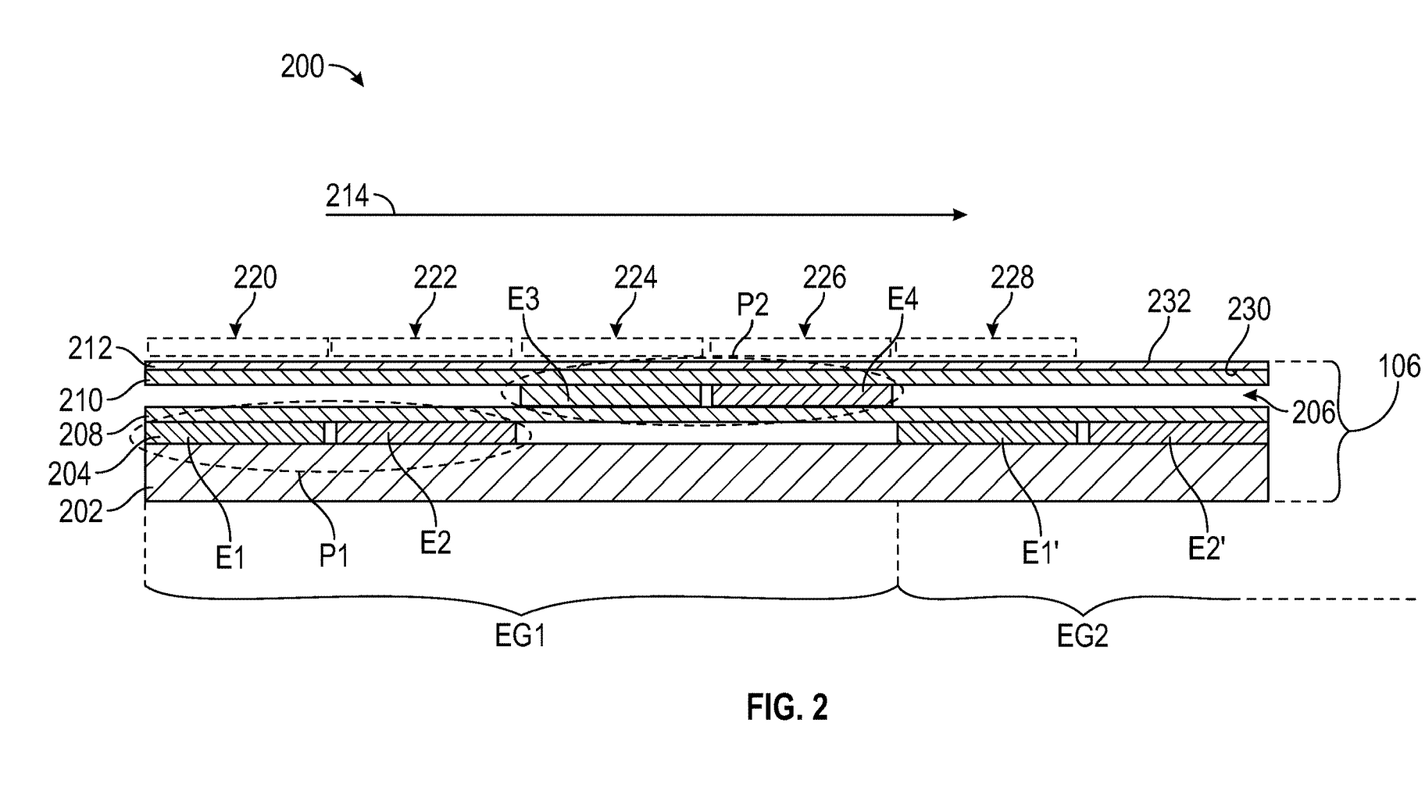
FIG. 2 shows a side cross-sectional view of the window of the Lidar system, in an embodiment.

FIG. 2 shows a side cross-sectional view 200 of the window 106 of the Lidar system 102, in an embodiment. The window 106 has been rotated from its orientation in FIG. 1 for ease of explanation. The window 106 includes an innermost glass 202 or innermost layer, generally made of a transparent or semi-transparent glass through which a laser beam can be transmitted. A first electrode layer 204 and a second electrode layer 206 are placed on top of (i.e., on the outer surface of) the innermost glass 202. The first electrode layer 204 is disposed directly on top of the innermost glass 202 and the second electrode layer 206 is disposed on top of the first electrode layer 204, such that the first electrode layer 204 is between the innermost glass 202 and the second electrode layer 206. A first dielectric layer 208 is disposed between the first electrode layer 204 and the second electrode layer 206 and a second dielectric layer 210 is disposed on top of the second electrode layer 206. An outermost layer 212 can be disposed on top of the second dielectric layer 210. The outermost layer 212 can be glass or other suitable material. The outermost layer 212 is exposed to contamination from the outside environment such as dirt, rain, etc. In various embodiments, the outermost layer 212 is made of hydrophobic glass material.

The first electrode layer 204 includes a first electrode E1 and a second electrode E2. The first electrode E1 and the second electrode E2 form a first electrode pair P1. The second electrode layer 206 includes a third electrode E3 and a fourth electrode E4. The third electrode E3 and the fourth electrode E4 form a second electrode pair P2. The first electrode pair P1 and the second electrode pair P2 form a first electrode group EG1. The first electrode, second electrode, third electrode and fourth electrode are aligned in a row along a selected direction 214 in the order shown (i.e., E1, E2, E3, E4). In various embodiments, the window 106 includes a plurality of electrode groups (EG1, EG2, . . . ) aligned in the selected direction 214. The selected direction 214 can be in a vertical direction along the window 106, oriented toward a bottom edge of the window. However, this is not meant to be a limitation of the invention.

The outermost layer 212 includes a first surface (bottom surface 230) and a second surface (top surface 232) opposite the first surface. The top surface 232 is exposed to the elements. Outermost layer 212 is coated onto the second dielectric layer 210. The second dielectric layer 210 covers both the first electrode pair P1 and the second electrode pair P2. Due to the presence of the first dielectric layer 208 and the second dielectric layer 210, the first pair P1 is separated from a bottom surface 230 by a first distance and the second pair P2 is separated from the bottom surface 230 by a second distance.

In an embodiment, the electrodes are activated in a selected activation sequence progressing along the selected direction 214. Activating an electrode refers to applying a non-zero voltage to the electrode. An activation sequence is applied in which one electrode (e.g., E1) is held at a high voltage while the remaining electrodes (e.g., E2, E3, E4) are held at low voltages or grounded at zero volts. When an electrode is activated or set to a high voltage, a rain droplet or fluid droplet on the top surface 232 of the outermost layer 212 is drawn to a location of the outermost layer 212 that is opposite the activated electrode. By activating the electrodes in order (i.e., E1 first, E2 second, E3 third and E4 fourth), the droplet can be moved along the surface and eventually off to a side of the window 106.

In an embodiment, the first electrode E1 is activated to draw the droplet to a first location 220 opposite the first electrode E1. The first electrode E1 is then deactivated or set to low voltage (i.e., set to ground) and the second electrode E2 is activated to draw the droplet from the first location 220 to a second location 222 opposite the second electrode E2. Continuing this process, the second electrode E2 is deactivated and the third electrode E3 is activated to draw the droplet from the second location 222 to a third location 224 opposite the third electrode E3. Finally, the third electrode E3 is deactivated and the fourth electrode E4 is activated to move the droplet from the third location 224 to a fourth location 226 opposite the fourth electrode E4. The fourth location 226 is a destination location for the droplet within the first electrode group EG1. When the droplet is at the fourth location, repeating the activation sequence (i.e., activating first electrode E1) activates the first electrode E1' of the adjacent electrode group EG2, thereby drawing the droplet from the fourth location 226 to a fifth location 228 opposite the electrode E1'. The droplet can thus be passed between electrodes groups and moved along the surface until a last electrode or edge of the window 106 is reached, thereby moving the droplet off to a side of the window 106.

Figure 3:
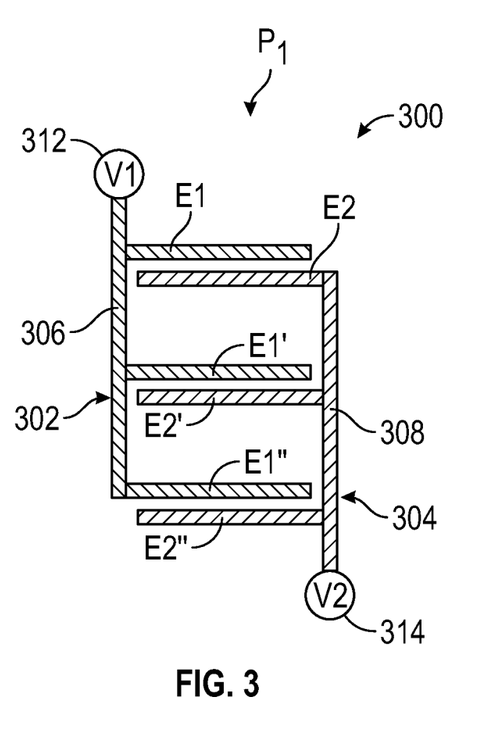
FIG. 3 shows a top view of a first electrode pair of the window.

FIG. 3 shows a top view 300 of the first electrode pair P1 of the window 106. The top view 300 is a view looking into the window 106 from outside the vehicle 100 (i.e., with the outermost layer 212 closest to the viewer). The top view 300 shows a first conductor 302 and a second conductor 304. The first conductor 302 includes strips that branch off of a first conductive backbone 306. The strips form the first electrodes (E1, E1', E1", . . . ) within their respective electrode groups (EG1, EG2, EG3, . . . ). The first conductor 302 is coupled to a first voltage source 312. Activation of the first voltage source 312 raises each of the first electrodes (E1, E1', E1", . . . ) to a selected voltage value. The second conductor 304 includes strips that branch off of a second conductive backbone 308. The strips form the second electrodes (E2, E2', E2", . . . ) within their respective electrode groups (EG1, EG2, EG3, . . . ). The second conductor 304 is coupled to a second voltage source 314. Activation of the second voltage source 314 raises each of the second electrodes (E2, E2', E2", . . . ) to selected voltage value.

Figure 4:
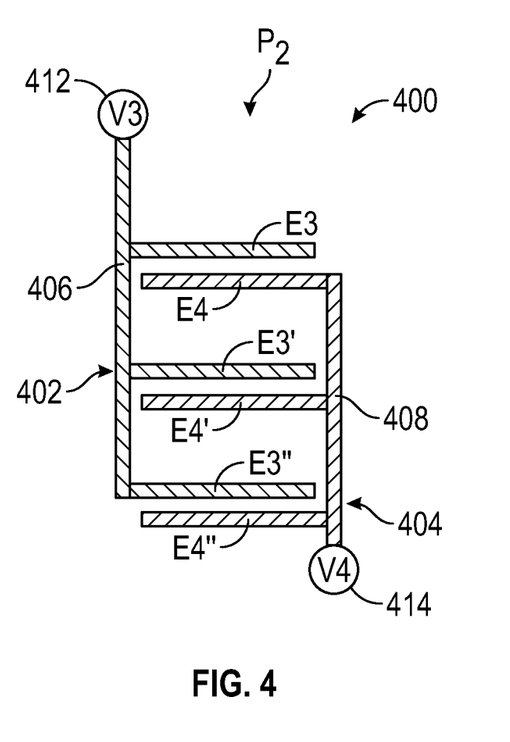
FIG. 4 shows a top view of the second electrode pair of the window.

FIG. 4 shows a top view 400 of the second electrode pair P2 of the window 106. The top view 400 shows a third conductor 402 and a fourth conductor 404. The third conductor 402 includes strips that branch off of a third conductive backbone 406. The strips form the third electrodes (E3, E3', E3", . . . ) within their respective electrode groups (EG1, EG2, EG3, . . . ). The third conductor 402 is coupled a third voltage source 412. Activation of the third voltage source 412 raises each of the third electrodes (E3, E3', E3", . . . ) to selected voltage value. The fourth conductor 404 includes strips that branch off of a fourth conductive backbone 408. The strips form the fourth electrodes (E4, E4', E4", . . . ) within their respective electrode groups (EG1, EG2, EG3, . . . ). The fourth conductor 404 is coupled to a fourth voltage source 414. Activation of the fourth voltage source 414 raises each of the fourth electrodes (E4, E4', E4", . . . ) to selected voltage value.

Figure 5:
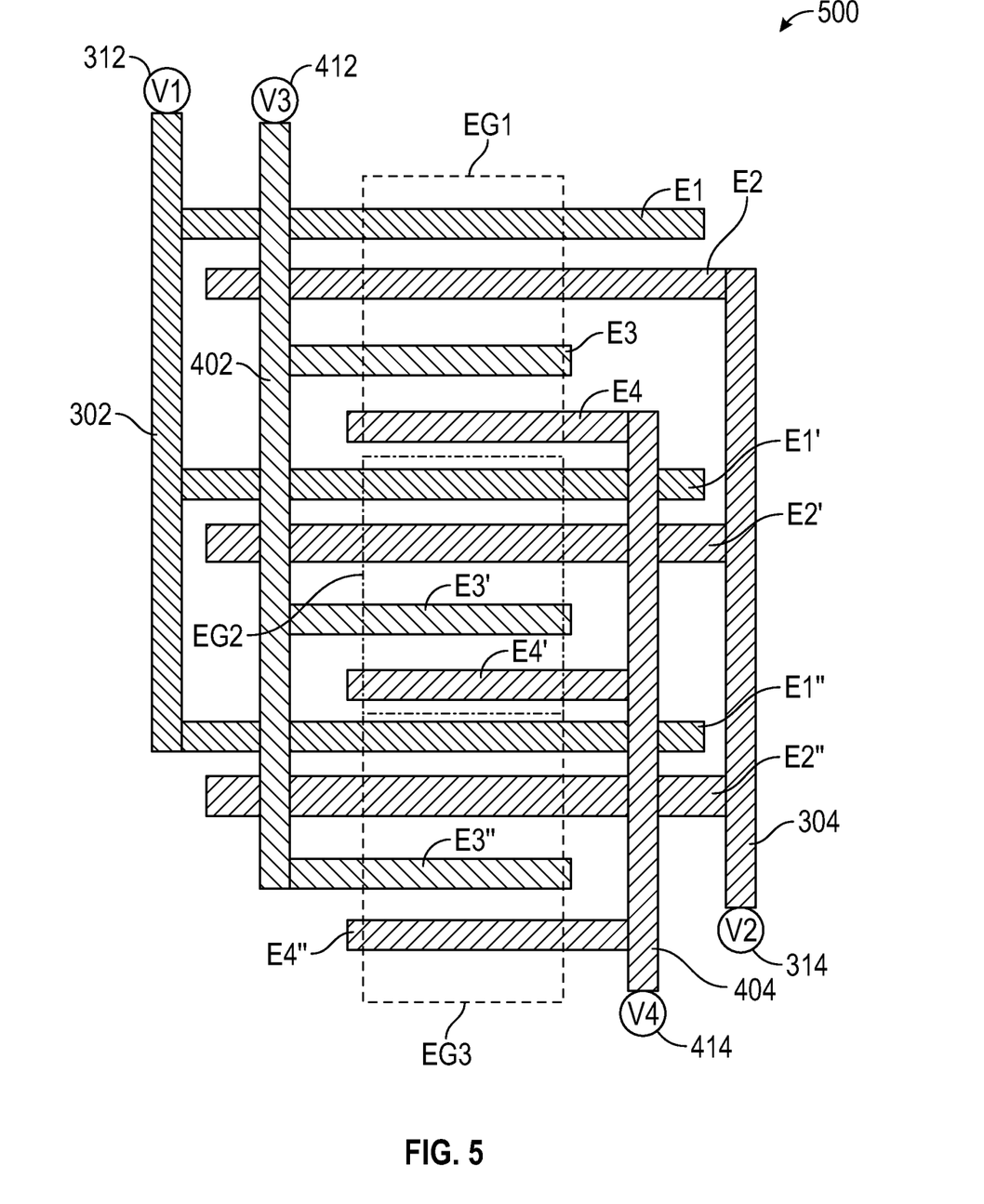
FIG. 5 shows a top view of the conductors of FIGS. 3 and 4 as arranged in the window of the Lidar system, in an illustrative embodiment.

FIG. 5 shows a top view 500 of the conductors of FIGS. 3 and 4 as arranged in the window 106 of the Lidar system 102, in an illustrative embodiment. As shown in FIG. 5, the conductors are arranged such that their respective electrodes form a repeating pattern. The first electrode group EG1 includes, in order, electrodes (E1, E2, E3, E4). The second electrode group EG2 is adjacent the first electrode group EG1 and includes, in order, electrodes (E1', E2', E3', E4'). The third electrode group EG3 is adjacent the second electrode group EG2 and includes, in order, electrodes (E1", E2", E3", E4"). The electrode groups are aligned in the same direction as their electrodes along the selected direction 214.

In the arrangement shown in FIG. 5, the first conductor 302 and the second conductor 304 are planar elements and are placed side by side within the first electrode layer 204. Similarly, the third conductor 402 and the fourth conductor 404 are planar elements and are placed side by side within the second electrode layer 206.

Figure 6:
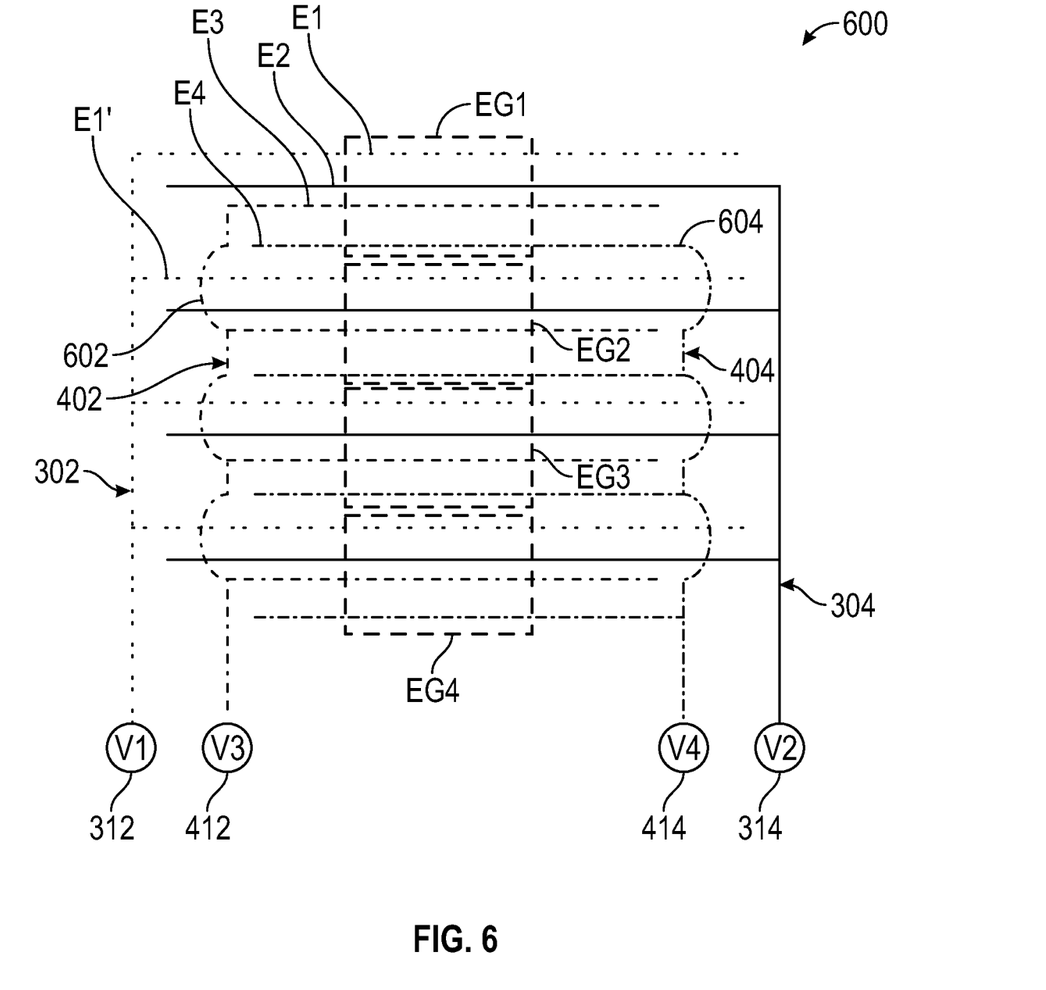
FIG. 6 shows an alternative arrangement of the conductors disposed in the window.

FIG. 6 shows an alternative arrangement 600 of the conductors disposed in the window 106. The alternative arrangement allows the electrodes to lie within a single electrode layer. Referring to the first electrode group EG1 for illustrative purposes, the electrodes (E1, E2, E3, E4) form the first electrode group EG1 and lie entirely within the single electrode layer. The third conductor 402 includes a jump section 602 that extends out of the electrode layer in order to prevent electrical contact with the first conductor 302 and second conductor 304. Similarly, the fourth conductor 404 includes a jump section 604 that extends out of the electrode layer in order to prevent electrical contact with the first conductor 302 and second conductor 304.

Figure 7:
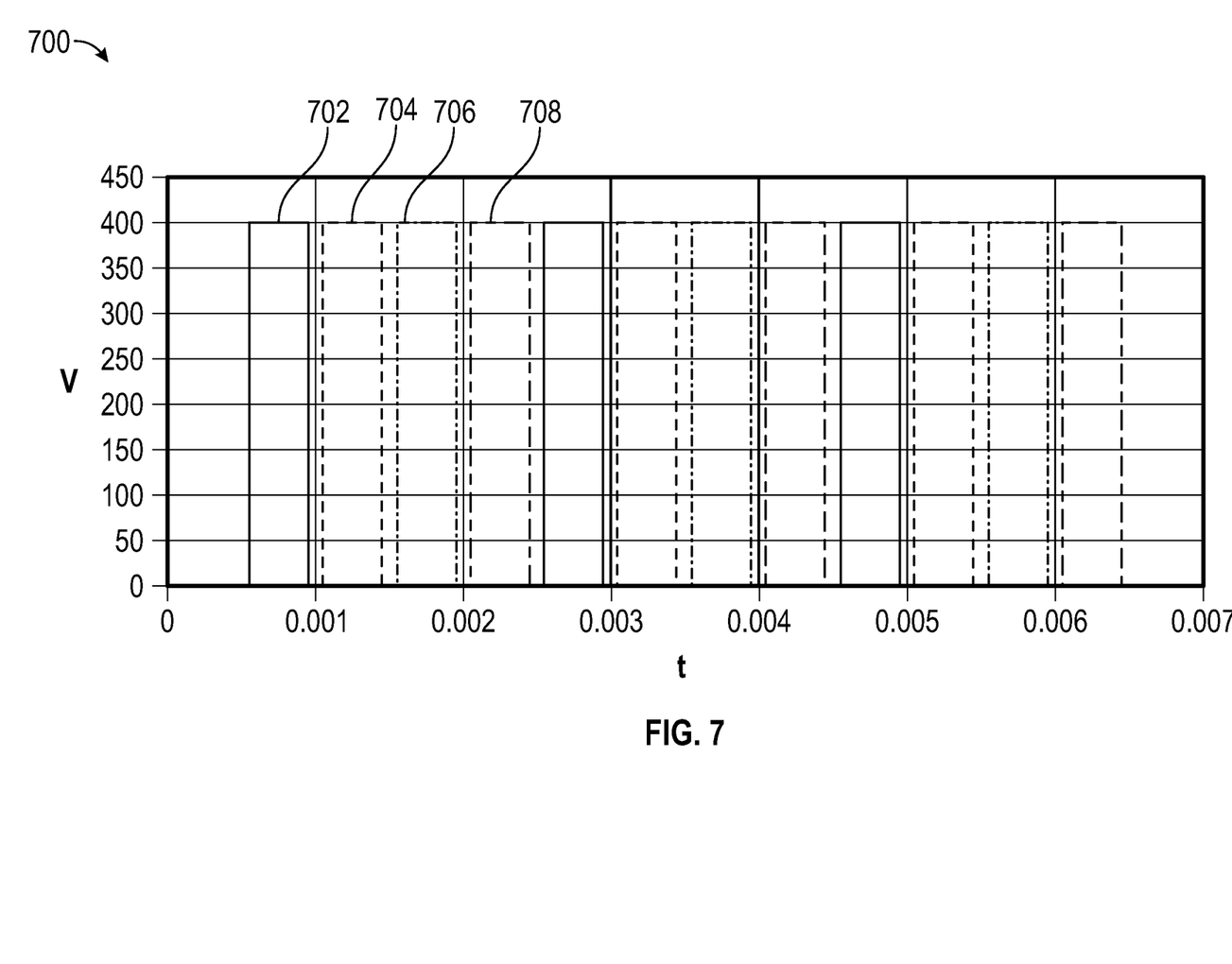
FIG. 7 shows an activation sequence for the voltage sources shown in FIGS. 5 and 6, in an illustrative embodiment.

FIG. 7 shows an activation sequence for the voltage sources shown in FIGS. 5 and 6, in an illustrative embodiment. Time is shown along the abscissa in seconds (s) and pulse amplitude is shown along the ordinate axis in Volts (V). The first voltage source 312 is activated to raise the first electrodes (E1, E1', . . . ) to a selected voltage value for a selected duration. The first voltage source 312 is then deactivated and the second voltage source 314 is activated to raise the second electrodes (E2, E2', . . . ) to a selected voltage value for the selected duration. The second voltage source 314 is then deactivated and the third voltage source 412 is activated to raise the third electrodes (E3, E3', . . . ) to a selected voltage value for the selected duration. The third voltage source 412 is then deactivated and the fourth voltage source 414 is activated to raise the fourth electrodes (E4, E4', . . . ) to a selected voltage value for the selected duration. After the fourth voltage source 414 is deactivated, the activation sequence can be repeated.

In various embodiments, the selected voltage is the same for each of the voltage sources and the duration for each the voltages sources are activated at the same. In the illustrative activation sequence of FIG. 7, the first activation pulse 702 (for the first voltage source 312) is initiated at about 0.5 milliseconds (msec) and is deactivated at about 1 msec. The second activation pulse 704 (for the second voltage source 314) is initiated at about 1 msec and is deactivated at about 1.5 msec. The third activation pulse 706 (for the third voltage source 412) is initiated at about 1.5 msec and is deactivated at about 2 msec. The fourth activation pulse 708 (for the fourth voltage source 414) is initiated at about 2 msec and is deactivated at about 2.5 msec. Each of the activation pulses has a magnitude of 400 Volts (V). It is to be understood that the duration and magnitude for the pulses shown in FIG. 7 are illustrative only. The duration and magnitude of the pulse can be any selected value, in various embodiments.

Figure 8:
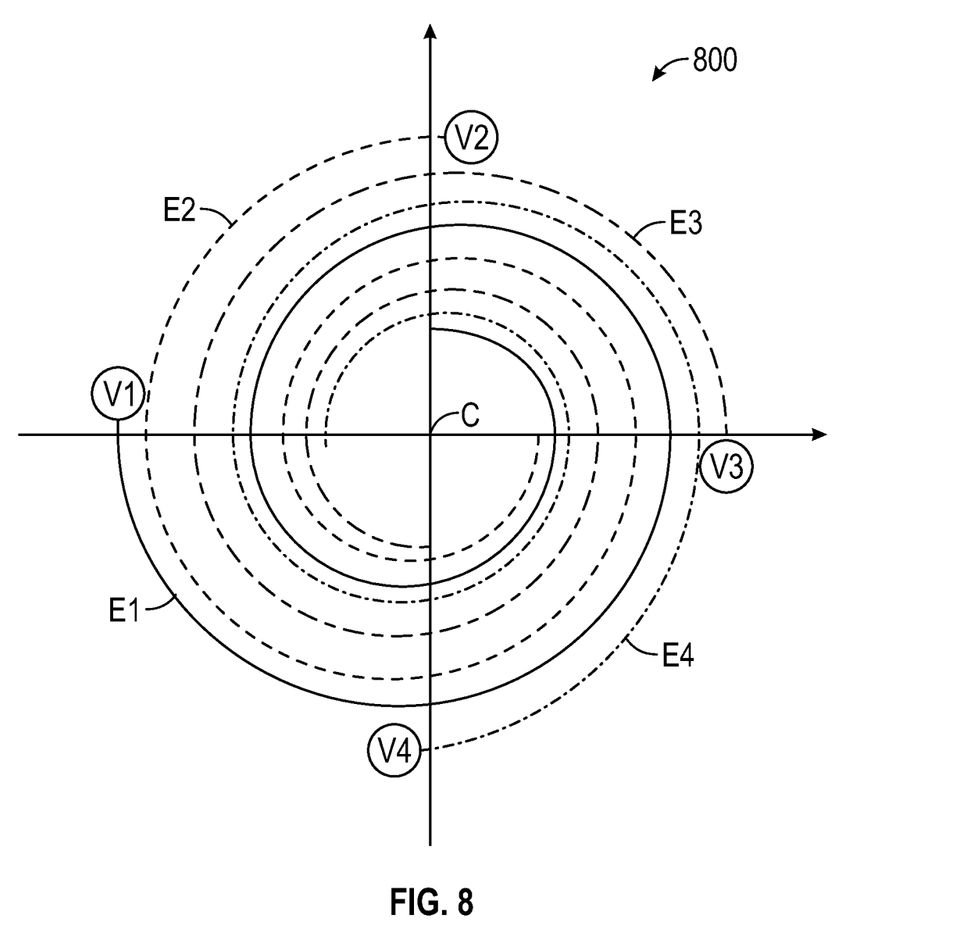
FIG. 8 shows an alternative arrangement of the electrodes within the window.

FIG. 8 shows an alternative arrangement 800 of the electrodes within the window 106. Each of the electrodes forms a spiral, with the spiral of a selected electrode being interleaved between its adjacent spirals. By activating the electrodes using the activation sequence of FIG. 7, a droplet can be drawn from a center "C" of the window 106 to a circumference or perimeter of the window. The electrode spirals can lie within a single electrode layer.

Figure 9:
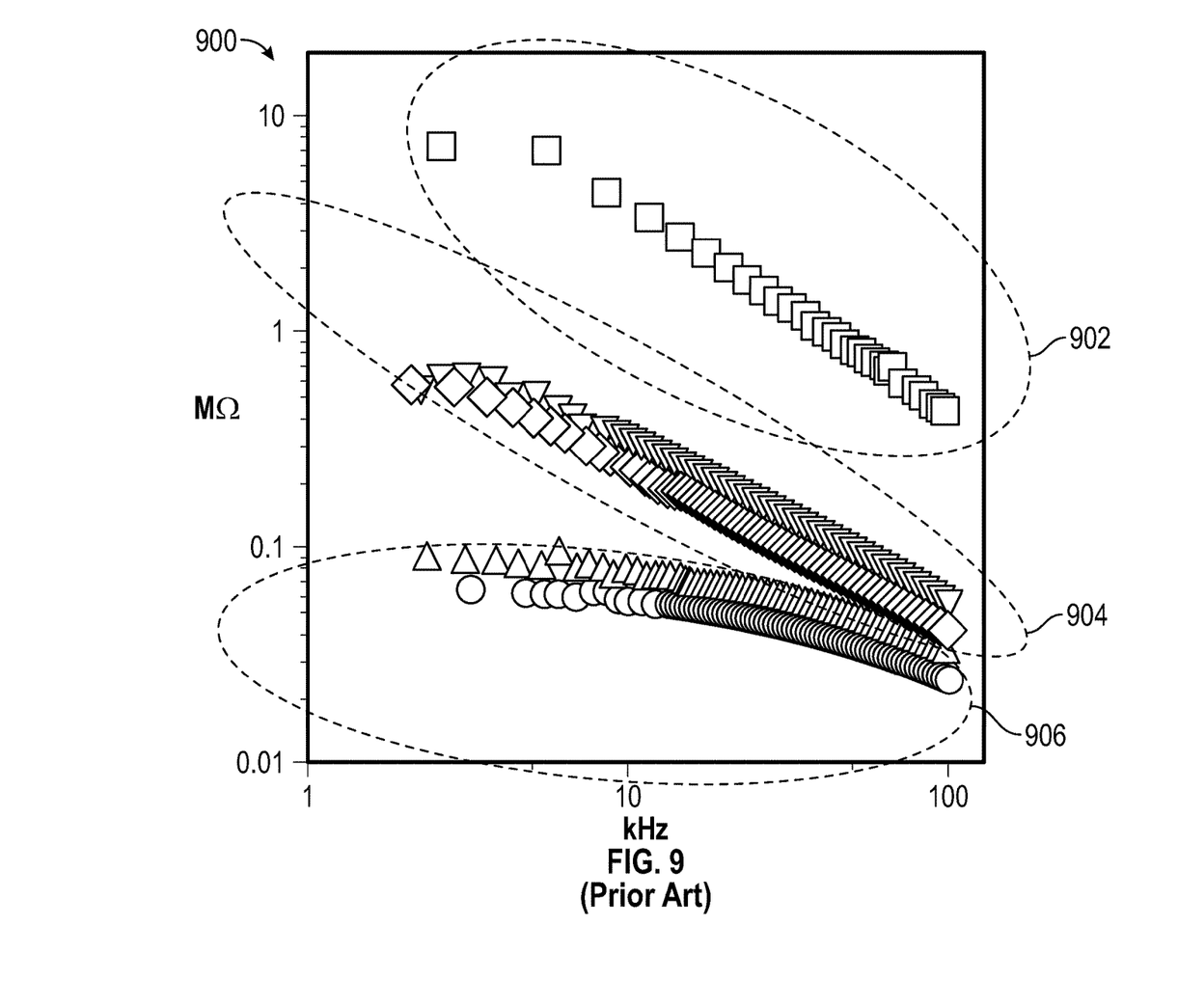
FIG. 9 (Prior Art) shows a graph of frequency-related resistivity values for different accumulation conditions of the window.

FIG. 9 (Prior Art) shows a graph 900 of frequency-related resistivity values for different accumulation conditions of the window 106. Frequency is shown along the abscissa in kilohertz (kHz) and resistivity is shown along the ordinate axis in Megaohms (MΩ). A first frequency group 902 includes resistivity measurements obtained when the hydrophobic glass is clear or dry (i.e., with no fluid on the glass). A second frequency group 904 includes resistivity measurements obtained when the hydrophobic glass has a layer of ice. A third frequency group 906 includes resistivity measurements obtained when the hydrophobic glass has a layer of water. The resistance on the window 106 can be measured and compared or matched with regions on graph 900 to determine the surface condition (i.e., accumulation condition).

The electrodes can be operated in various modes. In a first mode, a voltage can be applied at a selected frequency to at least the first electrode E1 and a resistance or impedance resulting from the applied voltage can be measured. Given data from the graph 900, the processor 108 can determine from the frequency and resistance measurements whether there is ice or water on the glass or whether the glass is dry. Once it is determined that ice is on the window, the processor 108 can operate the electrodes in a second mode to activate the electrodes to heat the ice, thereby melting the ice. Due to the electric field generated by the electrodes, heat is generated by the resistance of ice without heating the outermost layer 212. In a third mode, which is used when there is no more ice on the window but water remains on the window, the electrodes can be activated in sequence to move the water from the glass.

In various embodiments, in order to melt ice, a width of the electrodes is about 300 micrometers (μm) and a gap between electrodes (i.e., first electrode E1 and second electrode E2) is about 100 μm. An electrode is activated at about 30 kHz to melt ice and about at 1 kHz to move water along the surface of the glass. The second dielectric layer 210 has a thickness from about 2 μm to about 10 μm. An insulation layer can be placed between the electrode layers and the innermost glass 202 in order to reduce the amount of heat that is transferred to the glass.

Figure 10:
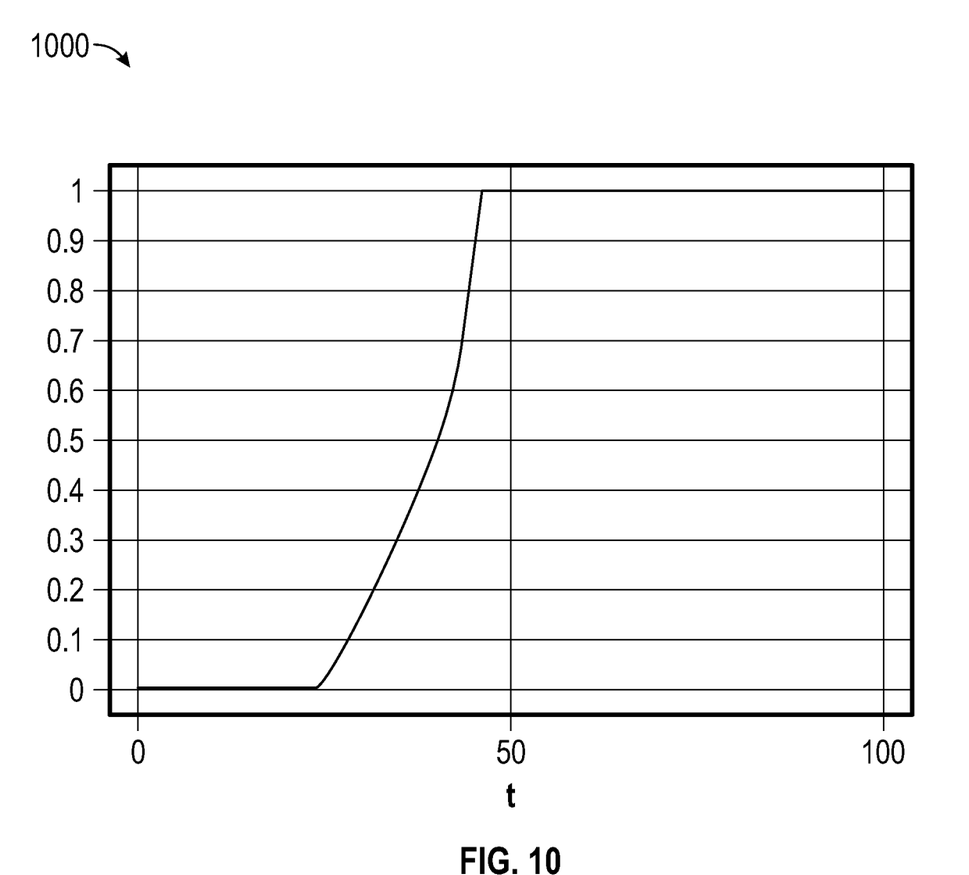
FIG. 10 shows a graph illustrating a melting rate of ice using the de-icing methods disclosed herein.

FIG. 10 shows a graph 1000 illustrating a melting rate of ice using the de-icing methods disclosed herein. Time is shown along the abscissa in seconds and a percentage of water phase on the window is shown along the ordinate axis as a ratio. At time t=0, the window has a total layer of ice, as indicated by the percentage being zero. At about 25 seconds, the ice begins to melt and transition to water, as shown by the increase in the water percentage. By about t=45 seconds and onward, the window is completely covered by the water phase (i.e., all of the ice is melted).

Although the invention is described herein as having four electrodes per electrode group, this is not meant to be a limitation of the invention. The number of electrodes in an electrode group can be any suitable number. In various illustrative embodiments, the invention can include three, five or six electrodes per electrode group.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of moving a fluid droplet along a window, comprising:

performing an activation sequence over a first electrode group and a second electrode group disposed on a first side of the window, each of the first electrode group and the second electrode group including at least a first electrode, a second electrode, a third electrode and a fourth electrode, wherein the first electrode and the second electrode are disposed in a first electrode layer located at a first distance from the first side, and the third electrode and the fourth electrode are disposed in a second electrode layer located at a second distance from the first side of the outermost layer, wherein performing the activation sequence includes:

activating first electrodes to a first electric potential while holding the second electrodes, the third electrodes and the fourth electrodes at a second electric potential to draw the fluid droplet to a first location on a second side of the window opposite the first electrode of the first electrode group;

activating the second electrodes to the first electric potential with the first electrodes, the third electrodes and the fourth electrodes held at the second electric potential to draw the fluid droplet from the first location to a second location on the second side of the window opposite the second electrode of the first electrode group; and activating the third electrodes to the first electric potential with the first electrodes, the second electrodes and the fourth electrodes held at the second electric potential to draw the fluid droplet from the second location to a third location on the second side of the outermost layer opposite the third electrode of the first electrode group; and activating the fourth electrodes to the first electric potential with the first electrodes, the second electrodes and the third electrodes held at the second electric potential to draw the fluid droplet from the third location to a fourth location on the second side of the outermost layer opposite the fourth electrode of the first electrode group.

2. The method of claim 1, further comprising repeating the activation sequence when the fluid droplet is at the fourth location to draw the fluid droplet away from the fourth location of the first group to the first location of the second group.

3. The method of claim 1, wherein one of: (i) the first electrode and the second electrode are arranged in a line along a selected direction; and (ii) the first electrode and the second electrode form a spiral.

4. The method of claim 1, further comprising performing at least one of: (i) measuring an impedance when at least the first electrode is activated to determine the presence of ice; and (ii) activating at least the first electrode to melt the ice.

5. A window of a Lidar system, comprising:

a first electrode group and a second electrode group disposed on a first side of an outermost layer of the window, each of the first electrode group and the second group including at least a first electrode, a second electrode, a third electrode and a fourth electrode, wherein the first electrode and the second electrode are disposed in a first electrode layer located at a first distance from the first side, and the third electrode and the fourth electrode are disposed in a second electrode layer located at a second distance from the first side of the outermost layer; and a processor configured to run an activation sequence which includes:

activating the first electrodes to a first electric potential with the second electrodes, the third electrodes and the fourth electrodes held at a second electric potential to draw a fluid droplet to a first location on a second side of the outermost layer opposite the first electrode of the first electrode group;

activating the second electrodes to the first electric potential with the first electrodes, the third electrodes and the fourth electrodes held at the second electric potential to draw the fluid droplet from the first location to a second location on the second side of the outermost layer opposite the second electrode of the first electrode group; and activating the third electrodes to the first electric potential with the first electrodes, the second electrodes and the fourth electrodes held at the second electric potential to draw the fluid droplet from the second location to a third location on the second side of the outermost layer opposite the third electrode of the first electrode group; and activating the fourth electrodes to the first electric potential with the first electrodes, the second electrodes and the third electrodes held at the second electric potential to draw the fluid droplet from the third location to a fourth location on the second side of the outermost layer opposite the fourth electrode of the first electrode group.

6. The window of claim 5, wherein the processor is configured to repeat the activation sequence to draw the fluid droplet away from the fourth location of the first group to the first location of the second group.

7. The window of claim 5, wherein one of: (i) the first electrode and the second electrode are arranged in a line along a selected direction; and (ii) the first electrode and the second electrode form a spiral.

8. The window of claim 5, wherein the processor is further configured to perform at least one of: (i) measuring an impedance when at least the first electrode is activated to detect the presence of ice; and (ii) activating at least the first electrode to melt the ice.

9. A Lidar system, comprising:
a window of the Lidar system, the window including a glass layer having a first side and a second side opposite the first side;
a first electrode group and a second electrode group disposed on a first side of an outermost layer of the window, each of the first electrode group and the second group including at least a first electrode, a second electrode, a third electrode and a fourth electrode, wherein the first electrode and the second electrode are disposed in a first electrode layer located at a first distance from the first side, and the third electrode and the fourth electrode are disposed in a second electrode layer located at a second distance from the first side of the outermost layer; and
a processor configured to run an activation sequence which includes:
activating the first electrodes to a first electric potential with the second electrodes, the third electrodes and the fourth electrodes held at a second electric potential to draw a fluid droplet to a first location on the second side of the glass layer opposite the first electrode of the first electrode group,
activating the second electrodes to the first electric potential with the first electrodes, the third electrodes and the fourth electrodes held at the second electric potential to draw the fluid droplet from the first location to a second location on the second side of the glass layer opposite the second electrode of the first electrode group; and
activating the third electrodes to the first electric potential with the first electrodes, the second electrodes and the fourth electrodes held at the second electric potential to draw the fluid droplet from the second location to a third location on the second side of the outermost layer opposite the third electrode of the first electrode group; and
activating the fourth electrodes to the first electric potential with the first electrodes, the second electrodes and the third electrodes held at the second electric potential to draw the fluid droplet from the third location to a fourth location on the second side of the outermost layer opposite the fourth electrode of the first electrode group.

10. The Lidar system of claim 9, wherein the processor is configured to repeat the activation sequence to draw the fluid droplet away from the fourth location of the first group to the first location of the second group.

11. The Lidar system of claim 9, wherein one of: (i) the first electrode and the second electrode are arranged in a line along a selected direction; and (ii) the first electrode and the second electrode form a spiral.

12. The Lidar system of claim 9, wherein the processor is further configured to perform at least one of: (i) measuring an impedance when at least the first electrode is activated to detect the presence of ice; and (ii) activating at least the first electrode to melt the ice.

13. The method of claim 1, wherein moving the fluid droplet from the first location to the destination location moves the fluid droplet in a vertical direction along the window.

14. The method of claim 1, wherein the window is made of a hydrophobic glass material.

15. The method of claim 1, further comprising passing a laser beam from a Lidar system through the window.

16. The window of claim 5, wherein the first electrode, the second electrode, the third electrode and the fourth electrode are arranged such that the processor running the electrode activation sequence moves the fluid droplet in a vertical direction along the window.

17. The window of claim 5, wherein the outermost layer is made of a hydrophobic glass material.

18. The window of claim 5, wherein a laser beam of the Lidar system passes through the window.

19. The Lidar system of claim 9, wherein the first electrode, the second electrode, the third electrode and the fourth electrode are arranged such that the processor running the electrode activation sequence moves the fluid droplet in a vertical direction along the window.

20. The Lidar system of claim 9, wherein the outermost layer is made of a hydrophobic glass material.

\* \* \* \* \*